United States Patent [19]
Boysen et al.

[11] Patent Number: 5,304,588
[45] Date of Patent: Apr. 19, 1994

[54] CORE-SHELL RESIN PARTICLE

[75] Inventors: Robert L. Boysen, Lebanon; Cliff R. Mure, Highland Park; Leonard S. Scarola, Union; Aaron S. Rhee, Belle Mead, all of N.J.

[73] Assignee: Union Carbide Chemicals & Plastics Technology Corporation, Danbury, Conn.

[21] Appl. No.: 886,188

[22] Filed: May 21, 1992

Related U.S. Application Data

[63] Continuation of Ser. No. 639,015, Jan. 9, 1991, abandoned, which is a continuation-in-part of Ser. No. 413,704, Sep. 28, 1989, Pat. No. 4,994,534.

[51] Int. Cl.$^5$ ............................ C08K 9/10; C08K 9/02
[52] U.S. Cl. ................................. 523/204; 523/207; 523/210
[58] Field of Search ..................... 523/204, 207, 210

[56] References Cited

U.S. PATENT DOCUMENTS

| | | | |
|---|---|---|---|
| 4,035,192 | 7/1977 | Busacca | 523/204 |
| 4,647,602 | 3/1987 | Wilczak et al. | 523/204 |
| 4,767,802 | 8/1988 | Sakakibara et al. | 523/204 |

FOREIGN PATENT DOCUMENTS 026672  7/1984  Japan .

Primary Examiner—Joseph L. Schofer
Assistant Examiner—Tom Weber
Attorney, Agent, or Firm—B. L. Deppenbrock

[57] ABSTRACT

A core-shell resin particle composed of a mixture of rubber and inert material with a core containing a majority of rubber while the shell contains a majority of inert material.

7 Claims, 4 Drawing Sheets

CORE-SHELL RESIN PARTICLE

This application is a continuation of prior U.S. application Ser. No. 07/639,015 filed Jan. 9, 1991 abandoned which is a continuation-in-part of application Ser. No. 07/413,704 filed Sept. 28, 1989 now U.S. Pat. No. 4,994,534.

BACKGROUND OF THE INVENTION

1. Field of the Invention

The present invention relates to a process for producing sticky polymers and more particularly to a process for producing sticky polymers in gas phase reactors at reaction temperatures in excess of the softening temperature of said sticky polymers. In addition, the present invention provides a novel particle produced by the process.

2. Description of the Prior Art

The introduction of high activity Ziegler-Natta catalyst systems has lead to the development of new polymerization processes based on gas phase reactors such as disclosed in U.S. Pat. No. 4,482,687 issued Nov. 13, 1984. These processes offer many advantages over bulk monomer slurry processes or solvent processes. They are more economical and inherently safer in that they eliminate the need to handle and recover large quantities of solvent while advantageously providing low pressure process operation.

The versatility of the gas phase fluid bed reactor has contributed to its rapid acceptance. Alpha-olefins polymers produced in this type of reactor cover a wide range of density, molecular weight distribution and melt indexes. In fact new and better products have been synthesized in gas phase reactors because of the flexibility and adaptability of the gas phase reactor to a large spectrum of operating conditions.

The term "sticky polymer" is defined as a polymer, which, although particulate at temperatures below the sticking or softening temperature, agglomerates at temperatures above the sticking or softening temperature. The term "sticking temperature", which, in the context of this specification, concerns the sticking temperature of particles of polymer in a fluidized bed, is defined as the temperature at which fluidization ceases due to excessive agglomeration of particles in the bed. The agglomeration may be spontaneous or occur on short periods of settling.

A polymer may be inherently sticky due to its chemical or mechanical properties or pass through a sticky phase during the production cycle. Sticky polymers are also referred to as non-free flowing polymers because of their tendency to compact into agglomerates of much larger size than the original particles. Polymers of this type show acceptable fluidity in a gas phase fluidized bed reactor; however, once motion ceases, the additional mechanical force provided by the fluidizing gas passing through the distributor plate is insufficient to break up the agglomerates which form and the bed will not refluidize. These polymers are classified as those, which have a minimum bin opening for free flow at zero storage time of two feet and a minimum bin opening for free flow at storage times of greater than five minutes of 4 to 8 feet or more.

Sticky polymers can also be defined by their bulk flow properties. This is called the Flow Function. On a scale of zero to infinity, the Flow Function of free flowing materials such as dry sand is infinite. The Flow Function of free flowing polymers is about 4 to 10, while the Flow Function of non-free flowing or sticky polymers is about 1 to 3.

Although many variables influence the degree of stickiness of the resin, it is predominantly governed by the temperature and the crystallinity of the resin. Higher temperatures of the resin increase its stickiness while less crystalline products such as very low density polyethylene (VLDPE), ethylene/propylene monomer (EPM), ethylene/propylene diene monomer (EPDM) and polypropylene (PP) copolymers usually display a larger tendency to agglomerate to form larger particles.

Thus the prior art has heretofore attempted to produce polymers at temperatures below the softening temperature of the polymers. This is based primarily on the fact that operating at or above the softening temperature would cause serious agglomeration problems. Indeed BP Chemicals Limited, PCT International Publication Number WO 88/02379, published April, 1988 which discloses use of 0.005% to less than 0.2% of a pulverulent inorganic substance during the reaction, nevertheless cautions against the use of temperatures in excess of the softening temperatures of the produced polyolefin. Moreover, this reference specifically discourages use of quantities of pulverulent inorganic substances in the reactor in excess of 0.2% by weight since as stated therein there is no further improvement in the polymerization or copolymerization process in the gaseous phase and use of amounts in excess of 0.2% deleteriously affect the quality of the polymer or copolymer produced.

It would be extremely beneficial to conduct these type polymerizations at temperatures at or above the softening point of the sticky polymers since it is well known that increases in polymerization temperatures generally enhance the yield of product in relation to the catalyst. In addition, purging of the polymer product becomes more efficient.

SUMMARY OF THE INVENTION

Broadly contemplated, the present invention provides a process for producing sticky polymers at polymerization reaction temperatures in excess of the softening temperature of said sticky polymers in a fluidized bed reactor in the presence of a catalyst, which comprises conducting said polymerization reaction above the softening temperatures of said sticky polymers in the presence of about 0.3 to about 80 weight percent, preferably about 5% to about 75% based on the weight of the final product of an inert particulate material having a mean particle size of from about 0.01 to about 10 micrometers or microns whereby polymer agglomeration of said sticky polymers is maintained at a size suitable for continuously producing said sticky polymers.

It has also been found that in the instant process for producing sticky polymers in a fluidized bed reactor that the surfaces of sticky EPDM resins (also referred to as ethylene propylene resins i.e., EPR) particles are continuously coated by the inert particulate material present in the reactor at certain concentrations. Simultaneously, the surface texture of the particles is being changed due to the continuous friction and collision between particles and between particles and reactor walls, occurring in the fluidized bed reactor. A granular EPR particle, produced in this manner, has a sticky EPR mass in its core and a shell of a non-sticky mixture of EPR and the inert particulate material at its surface. Hence the present invention comprises the unique composition of the polymer resin produced. Since the surfaces of the resin become non-sticky, they are free flowing, easy to handle, and bulk shippable. Furthermore, when the inert particulate material is selected from the ingredients for rubber formulations, compounding becomes particularly easy and efficient.

In the case when the inert particulate material is a carbon black or silica, the mean particle size is the average size of aggregate.

DETAILED DESCRIPTION OF THE INVENTION

Figure 1:
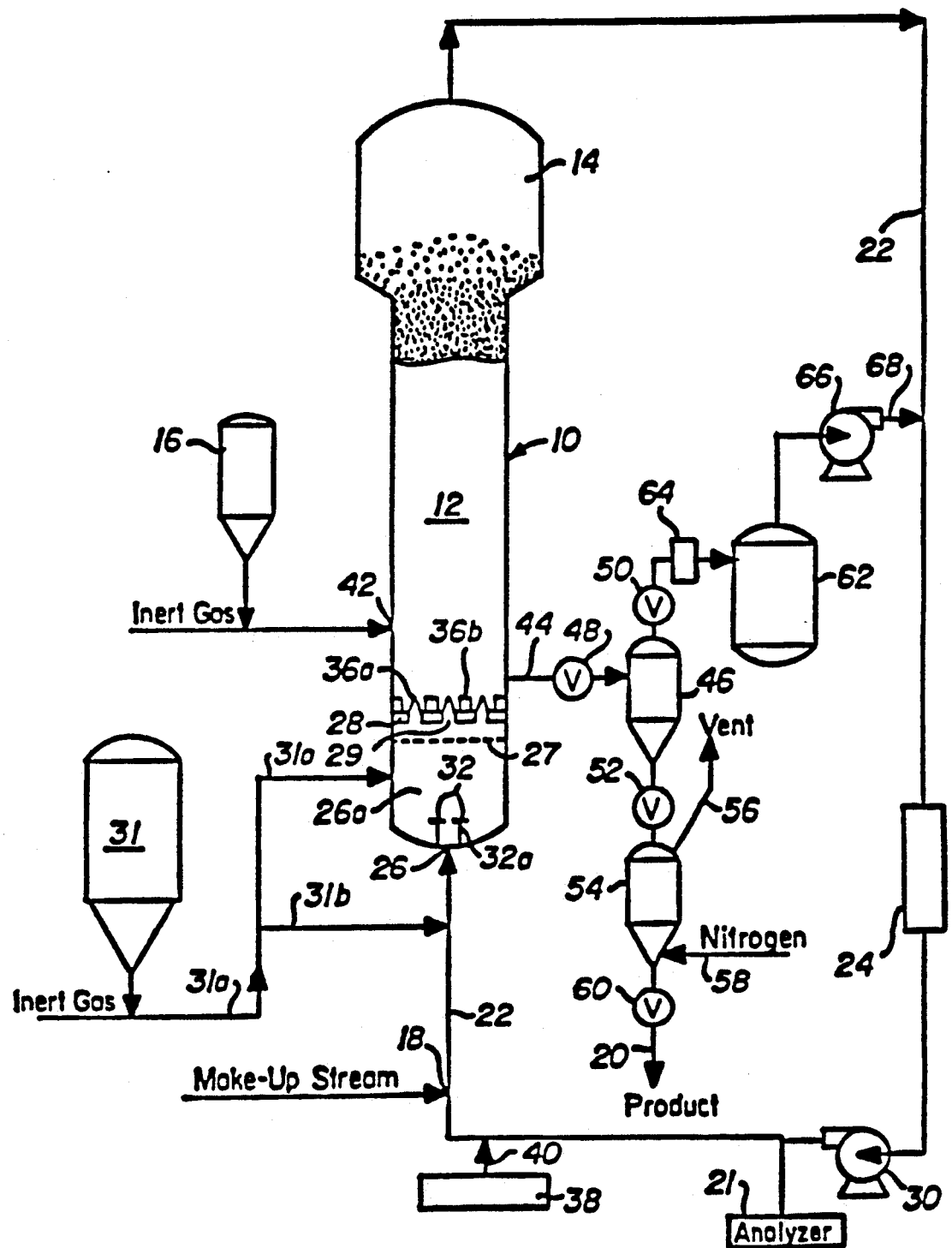
FIG. 1 illustrates a typical gas fluidized bed reaction scheme for producing sticky polymers.

The fluidized bed reactor can be the one described in U.S. Pat. No. 4,558,790 except that the heat exchanger is preferably located prior to the compressor and the introduction of the inert particulate material is at the bottom of the reactor or to the recycle line directed to the bottom of the reactor. Other types of conventional reactors for the gas phase production of, for example, polyethylene or ethylene copolymers and terpolymers can also be employed. At the start up the bed is usually made up of polyethylene granular resin. During the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. The fluidizing gas can also be a halogen or other gas. A typical cycle gas is comprised of ethylene, nitrogen, hydrogen, propylene, butene, or hexene monomers, diene monomers, either alone or in combination.

Examples of sticky polymers, which can be produced by subject process include ethylene/propylene rubbers and ethylene/propylene/diene termonomer rubbers, polybutadiene rubbers, high ethylene content propylene/ethylene block copolymers, poly (1-butene) (when produced under certain reaction conditions), very low density (low modulus) polyethylenes i.e., ethylene butene rubbers or hexene containing terpolymers, ethylene/propylene/ethylidenenorbornene and ethylene/propylene hexadiene terpolymers of low density.

Subject process can be carried out in a batch or continuous mode, the latter being preferred.

Characteristic of two types of resins which can be produced in subject process are as follows:

One type of resin is an ethylene/propylene rubber containing 25 to 65 percent, by weight, propylene. This material is sticky to the touch at reactor temperatures of 20° C. to 40° C. and has a severe tendency to agglomerate when allowed to settle for periods of more than two to five minutes. Another sticky resin is an ethylene/butene copolymer produced at reactor temperatures of 50° C. to 80° C. at density levels of 880 to 905 kilograms per cubic meter and melt index levels of 1 to 20 and chlorinated or chlorosulfonated after being produced in the fluidized bed reactor.

The inert particulate material employed according to the present invention are materials which are chemically inert to the reaction. Examples of inert particulate materials include carbon black, silica, clays and other like materials. Carbon blacks are the preferred materials. The carbon black materials employed have a primary particle size of about 10 to 100 nano meters and an average size of aggregate (primary structure) of about 0.1 to about 10 microns. The specific surface area of the carbon black is about 30 to 1,500 $m^2/gm$ and display a dibutylphthalate (DBP) absorption of about 80 to about 350 cc/100 grams.

The silica's which can be employed are amorphous silicas having a primary particle size of about 5 to 50 nanometers and an average size of aggregate of about 0.1 to about 10 microns. The average size of agglomerates of silica is about 2 to about 120 microns. The silicas employed have a specific surface area of about 50 to 500 $m^2/gm$ and a dibutylphthalate (DBP) absorption of about 100 to 400 cc/100 grams.

The clays which can be employed according to the present invention have an average particle size of about 0.01 to about 10 microns and a specific surface area of about 3 to 30 $m^2/gm$. They exhibit oil absorption of about 20 to about 100 gms per 100 gms.

The amount of inert particulate material utilized generally depends on the type of material utilized and the type of polymer produced. When utilizing carbon black or silica as the inert material, they can be employed in amounts of about 0.3 to about 50% by weight preferably about 5% to about 30% based on the weight of the final product produced. When clays are employed as the inert particulate material, the amount can range from about 0.3 to about 80% based on the weight of the final product preferably about 12% to 75% by weight.

The inert particulate materials can be introduced into the reactor either at the bottom of the reactor or to the recycle line directed into the bottom of the reactor. It is preferred to treat the inert particulate material prior to entry into the reactor to remove traces of moisture and oxygen. This can be accomplished by purging the material with nitrogen gas, and heating by conventional procedures.

A fluidized bed reaction system which is particularly suited to production of polyolefin resin by the practice of the process of the present invention is illustrated in the drawing. With reference thereto and particularly to FIG. 1, the reactor 10 comprises a reaction zone 12 and a velocity reduction zone 14.

In general, the height to diameter ratio of the reaction zone can vary in the range of about 2.7:1 to about 5:1. The range, of course, can vary to larger or smaller ratios and depends upon the desired production capacity. The cross-sectional area of the velocity reduction zone 14 is typically within the range of about 2.5 to about 2.9 multiplied by the cross-sectional area of the reaction zone 12.

The reaction zone 12 includes a bed of growing polymer particles, formed polymer particles and a minor amount of catalyst all fluidized by the continuous flow of polymerizable and modifying gaseous components in the form of make-up feed and recycle fluid through the reaction zone. To maintain a viable fluidized bed, the superficial gas velocity (SGV) through the bed must exceed the minimum flow required for fluidization which is typically from about 0.2 to about 0.8 ft/sec. depending on the average particle size of the product. Preferably the SGV is at least 1.0 ft/sec. above the minimum flow for fluidization of from about 1.2 to about 6.0 ft/sec. Ordinarily, the SGV will not exceed 6.0 ft/sec. and it is usually no more than 5.5 ft/sec.

Particles in the bed help to prevent the formation of localized "hot spots" and to entrap and distribute the particulate catalyst through the reaction zone. Accordingly, on start up, the reactor is charged with a base of particulate polymer particles before gas flow is initiated. Such particles may be the same as the polymer to be formed or different. When different, they are withdrawn with the desired newly formed polymer particles as the first product. Eventually, a fluidized bed consisting of desired polymer particles supplants the start-up bed.

The catalysts used are often sensitive to oxygen, thus the catalyst used to produce polymer in the fluidized bed is preferably stored in a reservoir 16 under a blanket of a gas which is inert to the stored material, such as nitrogen or argon.

Fluidization is achieved by a high rate of fluid recycle to and through the bed, typically on the order of about 50 to about 150 times the rate of feed of make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

Make-up fluid can be fed at point 18 via recycle line 22 although it is also possible to introduct make up fluid between heat exchanger 24 and velocity reduction zone 14 in recycle line 22. The composition of the recycle stream is measured by a gas analyzer 21 and the composition and amount of the make-up stream is then adjusted accordingly to maintain an essentially steady state gaseous composition within the reaction zone.

The gas analyzer is a conventional gas analyzer which operates in conventional manner to indicate recycle stream composition and which is adapted to regulate the feed and is commercially available from a wide variety of sources. The gas analyzer 21 can be positioned to receive gas from a point between the velocity reduction zone 14 and the dispenser 38, preferably after the compressor 30.

To ensure complete fluidization, the recycle stream and, where desired, part of the make-up stream are returned through recycle line 22 to the reactor at point 26 below the bed preferably there is a gas distributor plate 28 above the point of return to aid in fluidizing the bed uniformly and to support the solid particles prior to start-up or when the system is shut down. The stream passing upwardly through the bed absorbs the heat of reaction generated by the polymerization reaction.

The portion of the gaseous stream flowing through the fluidized bed which did not react in the bed becomes the recycle stream which leaves the reaction zone 12 and passes into a velocity reduction zone 14 above the bed where a major portion of the entrained particles drop back into the bed thereby reducing solid particle carryover.

The recycle stream exiting the compressor is then returned to the reactor at its base 26 and thence to the fluidized bed through a gas distributor plate 28. A fluid flow deflector 32 is preferably installed at the inlet to the reactor to prevent contained polymer particles from settling out and agglomerating into a solid mass and to maintain entrained or to re-entrain any liquid or solid particles which may settle out or become disentrained.

The fluid flow deflector, comprises an annular disc supported at a stand off distance above the reactor inlet 26 by the spacers 32a and divides the entering recycle stream into a central upward flow stream and an upward peripheral annular flow stream along the lower side walls of the reactor. The flow streams mix and then pass through protective screen 27, the holes or ports 29 of the distributor plate 28 and the angle caps 36a and 36b, secured to the upper surface of the distributor plate, and eventually into the fluidized bed.

The central upward flow stream in the mixing chamber 26a assists in the entrainment of liquid droplets in the bottom head or mixing chamber and in carrying the entrained liquid to the fluidized bed section during a condensing mode of reactor operation. The peripheral flow assists in minimizing build-up of solid particles in the bottom head because it sweeps the inner surfaces of the reactor walls. The peripheral flow also contributes to the re-atomization and re-entrainment of any liquid which may be disentrained at the walls or accumulate at the bottom of the diffuser mixing chamber, particularly with a high level of liquid in the recycle stream. The annular deflector means 32, which provides both central upward and outer peripheral flow in the mixing chamber, permits a reactor to be operated without the problems of liquid flooding or excessive build up of solids at the bottom of the reactor.

The temperature of the bed is basically dependent on three factors: (1) the rate of catalyst injection which controls the rate of polymerization and the attendant rate of heat generation; (2) the temperature of the gas recycle stream and (3) the volume of the recycle stream passing through the fluidized bed. Of course, the amount of liquid introduced into the bed either with the recycle stream and/or by separate introduction also affects the temperature since this liquid vaporizes in the bed and serves to reduce the temperature. Normally the rate of catalyst injection is used to control the rate of polymer production. The temperature of the bed is controlled at an essentially constant temperature under steady state conditions by constantly removing the heat of reaction. By "steady state" is meant a state of operation where there is no change in the system with time. Thus, the amount of heat generated in the process is balanced by the amount of heat being removed and the total quantity of material entering the system is balanced by the amount of material being removed. As a result, the temperature, pressure, and composition at any given point in the system is not changing with time. No noticeable temperature gradient appears to exist within the upper portion of the bed. A temperature gradient will exist in the bottom of the bed in a layer or region extending above the distributor plate, e.g., for about 6 to about 12 inches, as a result of the difference between the temperature of the inlet fluid and temperature of the remainder of the bed. However, in the upper portion or region above this bottom layer, the temperature of the bed is essentially constant at the maximum desired temperature.

Good gas distribution plays an important role in the efficient operation of the reactor. The fluidized bed contains growing and formed particulate polymer particles, as well as catalyst particles. As the polymer particles are hot and possible active, they must be prevented from settling, for if a quiescent mass is allowed to exist, any active catalyst present will continue to react and can cause fusion of the polymer particles resulting, in an extreme case, in the formation of a solid mass in the reactor which can only be removed with a great difficulty and at the expense of an extended downtime. Since the fluidized bed in a typical commercial size reactor may contain many thousand pounds of solids at any given time, the removal of a solid mass of this size would require a substantial effort. Diffusing recycle fluid through the bed at a rate sufficient to maintain fluidization throughout the bed is, therefore, essential.

Any fluid inert to the catalyst and reactants and which, if a liquid, will volatilize under the conditions present in the fluidized bed, can also be present in the recycle stream. Other materials, such as catalyst activator compounds, if utilized are preferably added to the reaction system downstream from compressor 30. Thus the materials may be fed into the recycle system from dispenser 38 through line 40 as shown in FIG. 1.

Figure 2:
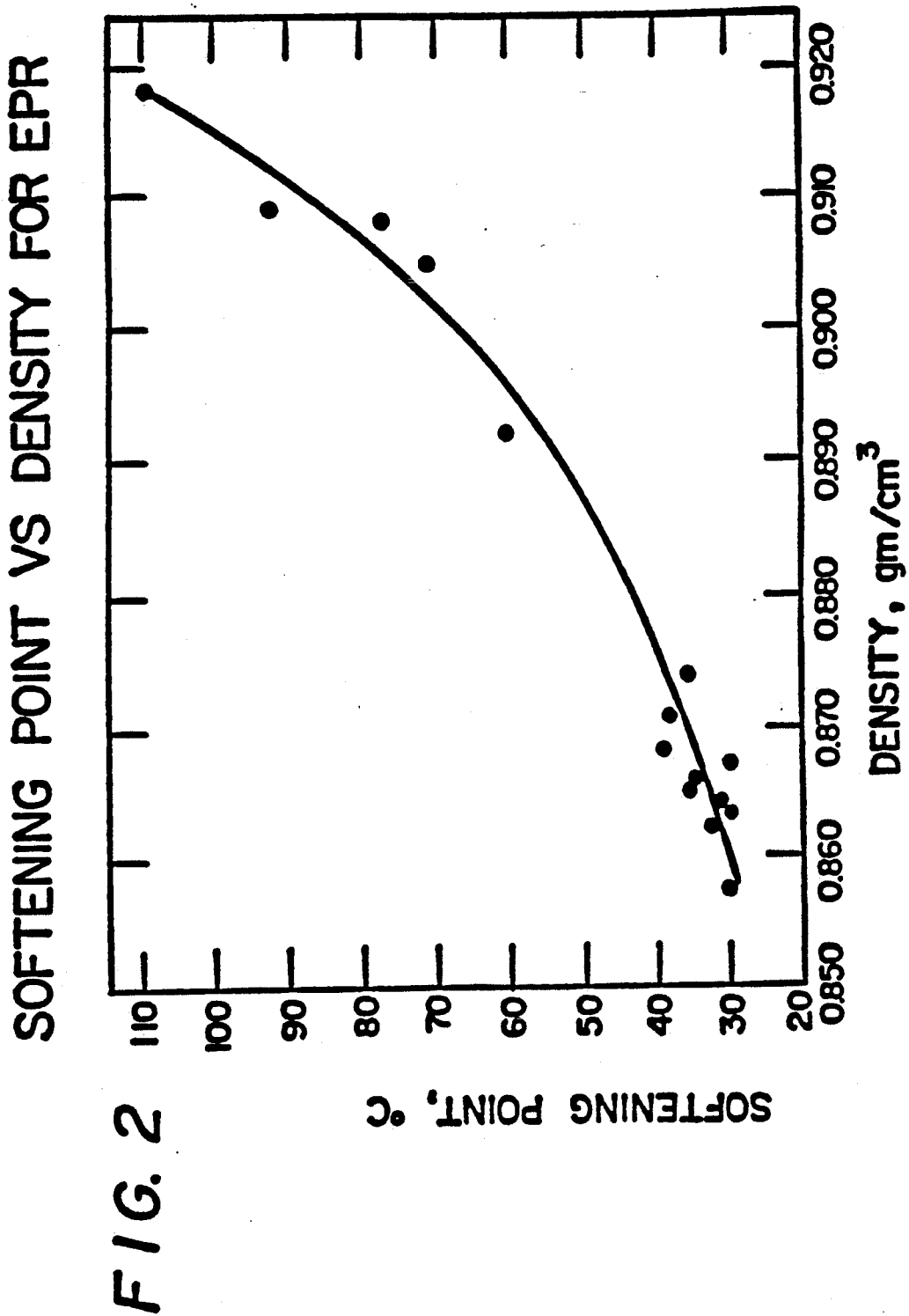
FIG. 2 is a graph which correlates the softening point of polymers having different densities.

According to the present invention, the fluid-bed reactor is operated above the softening temperature of the polymer particles. The softening temperature is a function of resin density as shown in FIG. 2. For example, EPR rubbers of density 0.860 gm/cm$^3$ has a softening point of about 30° C. whereas at a density of about 0.90, the softening point is about 67° C.

The fluid bed reactor may be operated at pressures of up to about 1000 psig. The reactor is preferably operated at a pressure of from about 250 to about 500 psig, with operation at the higher pressures in such ranges favoring heat transfer since an increase in pressure increases the unit volume heat capacity of the gas.

The catalyst which is preferably a transition metal catalyst is injected intermittently or continuously into the bed at a desired rate at a point 42 which is above the distributor plate 28. Preferably, the catalyst is injected at a point in the bed where good mixing with polymer particles occurs. Injecting the catalyst at a point above the distributor plate is an important feature for satisfactory operation of a fluidized bed polymerization reactor. Since catalysts are highly active, injection of the catalyst into the area below the distributor plate may cause polymerization to begin there and eventually cause plugging of the distributor plate. Injection into the fluidized bed aids in distributing the catalyst throughout the bed and tends to preclude the formation of localized spots of high catalyst concentration which may result in the formation of "hot spots". Injection of the catalyst into the reactor is preferably carried out in the lower portion of the fluidized bed to provide uniform distribution and to minimize catalyst carryover into the recycle line where polymerization may begin and plugging of the recycle line and heat exchanger may eventually occur.

The inert particulate materials are introduced into the reactor from Vessel 31 through line 31a together with inert gas or alternatively through 31b where it is joined with recycle line 22.

A gas which is inert to the catalyst, such as nitrogen or argon, is preferably used to carry the catalyst into the bed.

The rate of polymer production in the bed depends on the rate of catalyst injection and the concentration of monomer(s) in the recycle stream. The production rate is conveniently controlled by simply adjusting the rate of catalyst injection.

Under a given set of operating conditions, the fluidized bed is maintained at essentially a constant height by withdrawing a portion of the bed as product at the rate of formation of the particular polymer product. Complete instrumentation of both the fluidized bed and the recycle stream cooling system is, of course, useful to detect any temperature change in the bed so as to enable either the operator or a conventional automatic control system to make a suitable adjustment in the temperature of the recycle stream or adjust the rate of catalyst injection.

On discharge of particulate polymer product from the reactor 10, it is desirable, and preferable, to separate fluid from the product and to return the fluid to the recycle line 22. There are numerous ways known to the art to accomplish this. One system is shown in the drawings. Thus, fluid and product leave the reactor 10 at point 44 and enter the product discharge tank 46 through a valve 48 which is designed to have minimum restriction to flow when opened, e.g., a ball valve. Positioned above and below product discharge tank 46 are conventional valves 50, 52 with the latter being adapted to provide passage of product into the product surge tank 54. The product surge tank 54 has venting means illustrated by line 56 and gas entry means illustrated by line 58. Also positioned at the base of product surge tank 54 is a discharge valve 60 which, when in the open position, discharges product for conveying to storage. Valve 50, when in the open position, releases fluid to surge tank 62. Fluid from product discharge tank 46 is directed through a filter 64 and thence through surge tank 62, a compressor 66 and into recycle line 22 through line 68.

In a typical mode of operation, valve 48 is open and valves 50, 52 are in a closed position. Product and fluid enter product discharge tank 46. Valve 48 closes and the product is allowed to settle in product discharge tank 46. Valve 50 is then opened permitting fluid to flow from product discharge tank 46 to surge tank 62 from which it is continually compressed back into recycle line 22. Valve 50 is then closed and valve 52 is opened and product in the product discharge tank 46 flows into the product surge tank 54. Valve 52 is then closed. The product is purged with inert gas preferably nitrogen, which enters the product surge tank 54 through line 58 and is vented through line 56. Product is then discharged from product surge tank 54 through valve 60 and conveyed through line 20 to storage.

The particular timing sequence of the valves is accomplished by the use of conventional programmable controllers which are well known in the art. The valves can be kept substantially free of agglomerated particles by installation of means for directing a stream of gas periodically through the valves and back to the reactor.

As explained previously, each particle has a granular shape sticky polymer mass in its core and a non-sticky shell in its surface. This non-sticky shell is a mixture of the polymer and the inert particulate material. A schematic diagram of a cross-section of the polymer particle is depicted in FIG. 4.

Figure 4:
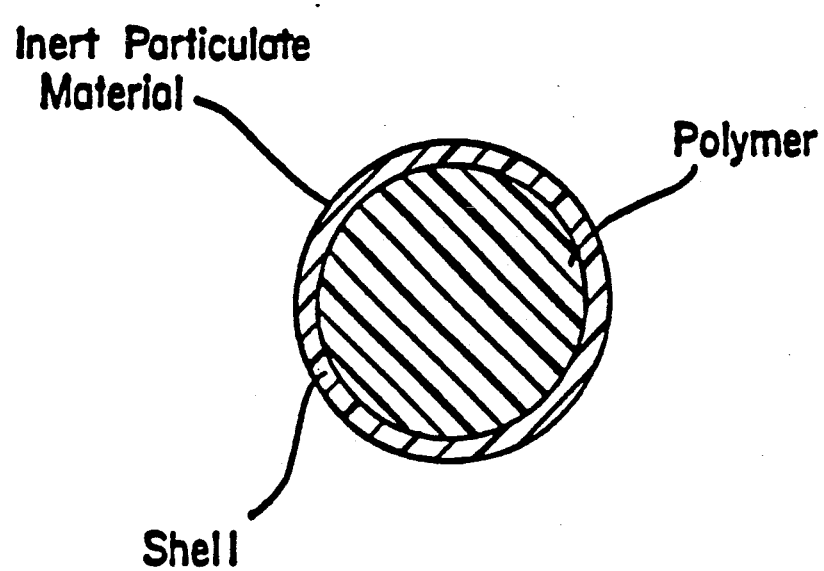
FIG. 4 is a schematic diagram of a cross-section of the novel polymer particle produced according to the process of the invention.

Thus referring to FIG. 4, the novel particle of the instant invention includes a central core substantially comprised of polymer and a non-sticky shell which is basically a mixture of the polymer and the inert particulate material.

Any of the inert materials discussed previously can be utilized. However, the preferred inert particulate material of choice is carbon black and although the following discussion is directed particularly to carbon black, it will be understood that the concepts and details of description are also applicable to the other inert materials.

In the process of the present invention, the EPDM particles are growing up from inside. Therefore, there should be little if any, carbon black in the core of each particle. However, it is always possible, and, in fact, it happens, to have nascent particles aggregate together and grow up in the fluidized bed. This can happen in the areas where the local concentration of the carbon black is low, resulting in insufficient coating of these premature particles. When this aggregate is fully grown up, its core is bound to have some carbon black that was brought in during the aggregation period. Therefore, the typical values of the amount of sticky polymer in the core of the EPDM particle are higher than 90% by weight.

On the other hand, the shell is being formed on the surface of the polymer particle through continuous coating of the carbon black and the surface texture change. Both coating and texture change take place simultaneously and progressively with time until the surfaces are saturated with the carbon black. These two mechanisms occur throughout the whole residence time of the particles in the reactor. The surface texture change of the polymer particle is related to the penetration of the carbon black into the polymer substrate at the interface of the polymer and the carbon black. This occurs because the EPR polymer is soft and the polymer particles experience the mechanical forces such as friction and collision described earlier. Furthermore, the active polymer molecules can always diffuse out through the voids between the carbon black aggregates in the shell layer. Therefore, the shell becomes a mixture of the polymer and the carbon black. The interface of the polymer and the carbon black normally has higher concentrations of the polymer than the outer surface which essentially consists of carbon black. Consequently, the typical average values of the carbon black contents in the shells of the particles are higher than 75% by weight.

The overall saturation concentration of the carbon black existing in and on the surface of the polymer particles depends upon the particle size, reaction conditions, reactor operating conditions, and the type of EPR product. For instance, the carbon black saturation level generally decreases when either one or multiple combination of the following conditions are provided in the reactor: 1) the average particle size is increased; 2) the superficial gas velocity is raised; 3) the crystallinity of the product is increased; and 4) the molar concentrations of the comonomer (propylene) and the termonomer (diene) in the reactor are decreased. Nevertheless, the typical values of the carbon black concentration are within the range of 0.3 to 80% by weight, preferably in the range of 5 to 75% by weight based on the total weight of the final product.

The granular EPDM resin produced in this manner has a weight average particle size of about 0.01 to 0.09 inches in diameter depending upon the amount of the inert particulate material present in the reactor. Normally, the particle size decreases as the amount of the particulate material is increased. This is because the aggregation of nascent polymer particles is discouraged by the presence of a larger amount of the inert particulate material.

Since the surfaces of these EPR particles are not sticky, the product is free flowing, easy to handle, and bulk shippable. One important advantage is that the monomers coming out of the reactor with the resin can be purged out easily in a conventional purging facilities at high temperature. Examples of purging facilities would be a fluidized bed purger or a counter-current mass flow purger. Purging schemes which require melting of the polymer are not necessary for the process. With equal importance, the product is easy to compound because it is in granular form (vs. bale has to be cut first for compounding) and some of the compounding ingredients are already incorporated on the granular resin.

The following Examples will illustrate the present invention.

Figure 3:
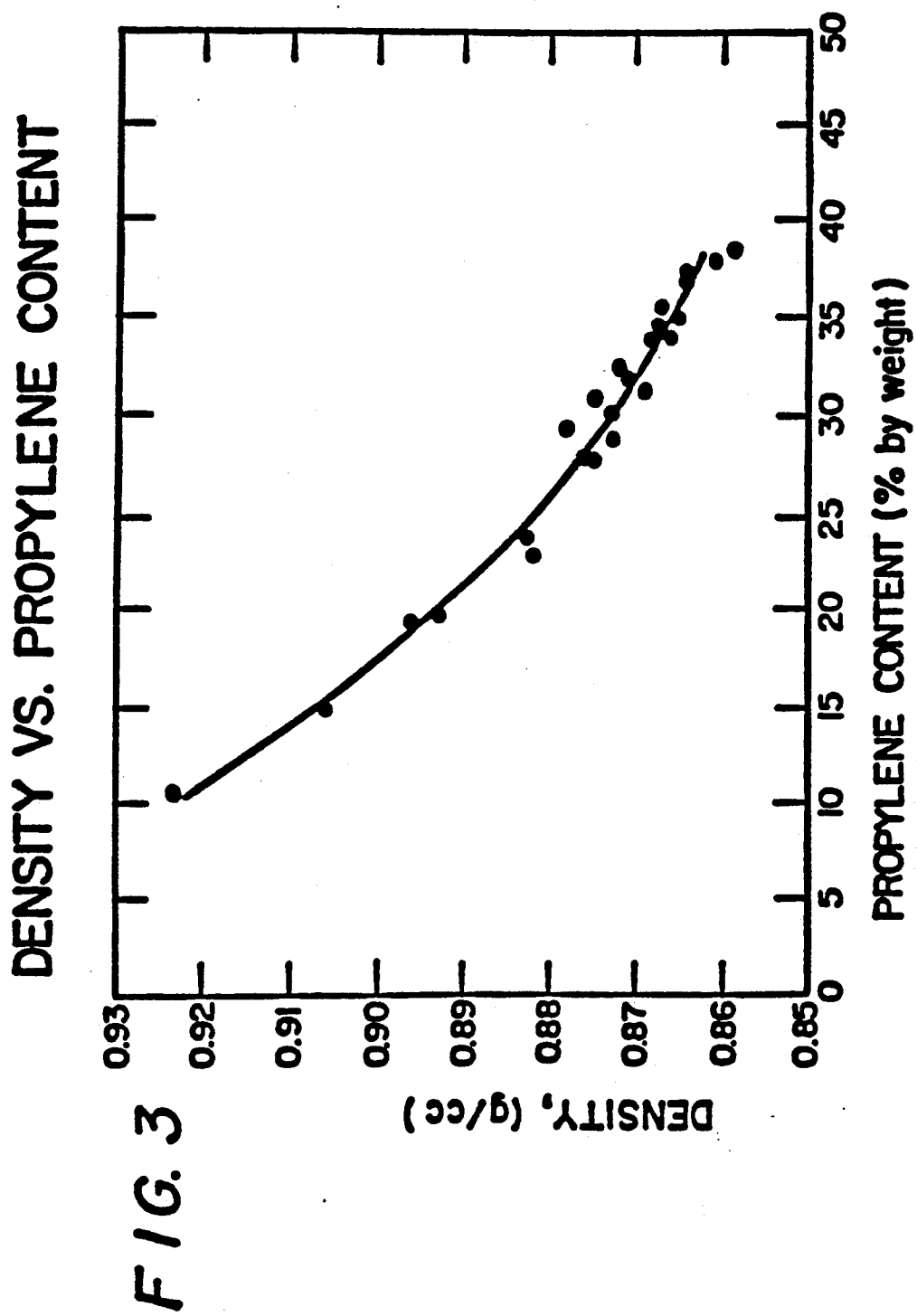
FIG. 3 is a graph which correlates the density of polymer versus propylene content.

In the Examples, the softening point of an ethylene-propylene rubber (EPR) was determined by its density as shown in FIG. 2. The softening point of the polymer decreases with a decrease of its density. The melt index of the polymer and the existence of particulate material on the surface of the granular polymer resin may affect its softening point. The softening points of EPR of various densities were measured by using a Dilatometer and the results are plotted in FIG. 2. On the other hand, the densities of ethylene-propylene copolymers (EPM) as well as ethylene-propylene-diene terpolymers (EPDM) decrease with an increase of the amount of propylene incorporated in the polymer as shown in FIG. 3. Therefore, once the propylene content in an EPR is measured, the softening point of the polymer can be determined by using these two figures.

For all the Examples shown below for EPM and EPDM polymerizations, a Ziegler-Natta catalyst system was used, one such catalyst being a titanium based catalyst and the other being a vanadium based catalyst which also included a cocatalyst and a promoter. Triisobutylaluminum (TIBA) or triethylaluminum (TEAL) was used as the cocatalyst. Freon or chloroform was used as the promoter. Only the vanadium based catalyst needs such a promoter. Since only a small amount of such cocatalyst and promoter is needed for the polymerization reaction, typically, a 5 or 10 weight % solution with isopentane is made and fed into the reactor to facilitate the control of the feed rate. The reactor total pressure was typically maintained at about 300 psi. The partial pressure of ethylene was typically 120 psi for the vanadium based catalyst and 50 psi for the titanium based catalyst, unless specified differently in the Examples. The superficial gas velocity in the fluidized bed reactor was in the range of 1.6 to 2.7 ft/s. The major operating variables were the reactor temperature and partial pressure of propylene.

The density of or propylene content in such polymers was controlled by controlling the partial pressure of propylene (comonomer), more specifically the molar ratio of propylene to ethylene ($C_3/C_2$). The higher the ratio in the reactor, the lower the density of the polymer or the higher the propylene content in the polymer to be produced. At the beginning of each run, therefore, the value of $C_3/C_2$ ratio was maintained low until enough bed turn-overs were attained with good polymerization reaction, more specifically three bed turn-overs. To lower the polymer density, the ratio was then slowly increased to the next higher level by gradually increasing the partial pressure of propylene. Three bed turn-overs were attained again at the desired ratio before the partial pressure of propylene was raised further. As the partial pressure of propylene was increased, the density of the polymer dropped down, so did the softening point of the polymer. When the softening point of the polymer produced became close to or greater than the reactor temperature, fluidization of polymer resin ceased all at once due to resin agglomeration resulting in a very undesirable channelling flow.

At a given molar ratio of propylene to ethylene ratio, propylene incorporation in EPR is reduced when the reactor temperature is raised. This is observed with both vanadium and titanium based catalyst systems. To produce EPR of given density and propylene content at a higher reactor temperature, the molar ratio of propylene to ethylene ratio had to be maintained higher than low temperature operation cases.

The melt index (or flow index) was controlled by controlling the molar ratio of hydrogen to ethylene ($H_2/C_2$). The higher the molar ratio in the reactor, the higher the melt index of the EPR to be produced. Normally, high melt index EPR granular resin is more difficult to produce than low melt index in a fluidized bed reactor. The diene used for the production of EPDM was 5-ethylidene-2-norbornene (ENB). The rest of the gas composition was nitrogen. The amounts of propylene and ENB incorporated in EPR were measured by Infrared Spectroscopy. Also, the amount of particulate material in EPR was determined by Thermogravimetric Analysis.

EXAMPLE 1

Production of EPM without added inert particulate materials at a reactor temperature below the softening point.

An attempt was made to produce EPM granular resin in a pilot fluidized bed reactor (inner diameter of about 14 inches) with a vanadium catalyst at a reactor temperature of 20° C. As shown in FIG. 2, this reactor temperature is about 10° C. below the softening points of all the EPR resins of interest. TIBA and chloroform were used as the cocatalyst and promoter, respectively. The typical value of the $H_2/C_2$ ratio was about 0.003. The superficial gas velocity was typically about 1.8 ft/s. Without having any agglomerations of resin in the reactor, it was possible to produce EPM granular resin which has a density of 0.864 g/cc and the melt index of 0.77 dg/10 min. The propylene content incorporated in the product was about 35% by weight.

The following Example 2 demonstrates the conventional problems when operating close to the softening point without the addition of the inert particulate material of the instant invention.

EXAMPLE 2

Utilizing the same reactor and with the same catalyst, cocatalyst, promoter, hydrogen to ethylene ratio, and superficial gas velocity described in Example 1, attempts were made to produce EPM granular resins at a reactor temperature of 30° C. As shown in FIG. 2, this temperature is close to the softening point of the EPM resin which has a density range of about 0.860 to 0.865 g/cc. The reactor was running well while the density was decreased from 0.870 to 0.868 g/cc by increasing the $C_3/C_2$ ratio from 0.325 to 0.376. The incorporated propylene contents were 31.7% and 34.1% by weight for $C_3/C_2$ ratios of 0.325 and 0.376, respectively.

When the $C_3/C_2$ ratio was raised from 0.376 to 0.403 to further decrease the density below 0.868 g/cc, the fluidization ceased suddenly resulting in the formation of a channelling flow evidenced by a sharp decrease of pressure drop across the bed. The reactor was shutdown, and big agglomerates and chunks were taken out from the reactor. An analysis of the agglomerates showed that the density and melt index of the polymer were 0.867 g/cc and 0.97 dg/10 min, respectively. The incorporated propylene content was about 35% by weight.

The following Example 3 demonstrates reactor temperature operation above the softening point of the resin.

EXAMPLE 3

Utilizing the same reactor and with the same catalyst, cocatalyst, and the hydrogen to ethylene ratio described in Example 1, attempts were made to produce EPM granular resin at a reactor temperature of 40° C. As shown in FIG. 2, this temperature is higher than the softening point of EPM having a density less than 0.873 g/cc. When the molar ratio of propylene to ethylene was raised to 0.374, a defluidization of the bed, or the formation of the channelling flow evidenced by the same phenomena described in Example 2, called for a reactor shut-down. Many agglomerates and chunks were taken out of the reactor. They were analyzed and the density and melt index of the polymer were 0.866 g/cc and 0.31 dg/10 min., respectively. The content of propylene incorporated in the polymer was 34% by weight.

The following Example 4 demonstrates that a reactor cannot be operated at or close to the softening temperature of the polymer regardless of the catalyst system used.

EXAMPLE 4

Reactor temperatures below and close to softening point with a titanium catalyst.

Since all the attempts at producing vanadium catalyzed EPM at reactor temperatures above its softening point failed due to the formation of agglomerates and chunks in the reactor, titanium catalysts were utilized at the reactor temperatures below and near the softening point, i.e., 20° C. and 30° C. The examples were conducted in the same reactor described in Example 1. The superficial gas velocity was about 1.8 ft/s for the runs. TIBA was used as a cocatalyst. The titanium catalyst system does not require a promoter. However, it requires substantially higher $C_3/C_2$ and $H_2/C_2$ ratios in the reactor than the vanadium catalyst system to produce EPM of the same density (or propylene incorporation) and melt index. While maintaining the $H_2/C_2$ ratio at 0.050 and the ethylene partial pressure at about 54 psi, two runs were made: one at 20° C. and the other at 30° C. During both runs, the $C_3/C_2$ ratio was gradually increased from 1.6 to the aimed value of 2.2 in order to lower the density of EPM from 0.875 to the aimed value of 0.865. However, fluidization ceased whenever an attempt was made to lower the density below 0.870 g/cc at both reactor temperatures.

EXAMPLE 5

Production of ethylene propylene diene terpolymers (EPDM) without particulate materials at a reactor temperature below the softening point.

Attempts were made to produce EPDM granular resin in a fluidized bed pilot plant reactor (inner diameter of about 14 inches) with a vanadium catalyst at a reactor temperature of 30° C. The partial pressure of ethylene was about 130 psi. TIBA and chloroform were used as the cocatalyst and promoter, respectively. The typical value of $H_2/C_2$ was 0.002. The ENB concentration in the fluidized bed was about 4.5% by weight. The superficial gas velocity was about 1.8 ft/s. Without having any reactor operability problems, it was possible to produce EPDM granular resins which had a density higher than 0.882 g/cc. The propylene and ENB contents incorporated in the polymer were about 21% and 1.5% by weight, respectively. However, an attempt to lower the polymer density below 0.880 g/cc by increasing the $C_3/C_2$ ratio resulted in a reactor shut-down because fluidization ceased. The reactor was opened to remove the chunks and agglomerates. An analysis of the chunks showed that the density of, propylene content in, and ENB content in the polymer were respectively 0.8775 g/cc, 28.0% by weight, and 2.1% by weight.

The following Example 6 demonstrates the results obtained when the reactor temperature is close to the softening point of EPDM resin.

EXAMPLE 6

Utilizing the same reactor and with the same catalyst, cocatalyst, and promoter described in Example 5, an attempt was made to produce EPDM at a reactor temperature of 40° C. The reactor conditions were the same as those in Example 5 except for the ENB concentration in the fluidized bed and the $H_2/C_2$ ratio, both of which were higher 5.5% by weight and 0.003 respectively than those in Example 5. When the $C_3/C_2$ ratio was raised to 0.34 in an effort to lower the polymer density below 0.885 g/cc, fluidization ceased due to the formation of a channeling flow. The reactor was shut-down and the samples of the chunks and agglomerates were analyzed. The density and melt index of the polymer were 0.883 g/cc and 0.15 dg/10 min., respectively. The amounts of propylene and ENB incorporated in the polymer were 22.9% and 2.6% by weight, respectively.

The following examples 7–13 demonstrate the benefits of the invention wherein an inert particulate material is utilized.

However, when a particulate material is introduced into the reactor producing EPR granular resin, the product becomes a mixture of EPR and the particulate material. Normally, the density of the particulate material is different from the density of EPR itself. Therefore, the density of the mixture would be different from the true density of the polymer itself. The true density of the polymer, however, can be calculated by using the following correlation:

$$D_t = (1-x)D_m / \{1-(x D_m/D_p)$$

where $D_t$ is the true density of the polymer, $x$ is the weight fraction of the particulate material, $D_m$ is the density of the mixture, and $D_p$ is the density of the particulate material.

Using a Dilatometer, the effect of various inert particulate materials on EPR softening point was determined to be negligible. As mentioned earlier, the measurement of propylene content in EPR is an indirect measurement of its true density. Therefore, the propylene content in and the mixture density of EPR as produced from the reactor were measured and are given in the following examples. Also, the true density of each EPR, calculated with Equation 1, is listed in each example. It should be noted in the previous examples that no EPR, which has propylene content higher than 35% by weight, could be produced without the inert particulate material.

The following Example 7 demonstrates the production of EPM with carbon black as the inert particulate material.

EXAMPLE 7

Using a carbon black of primary particle size of 55 nm, an average size of aggregate of 2 microns (RAVEN-230 available from Columbian Chemical Co. Inc.), a specific surface area of 44 $m^2/gm$ and a DBP of 220 cc/100 gm. as the particulate material, the same reactor described in Example 1 was utilized to produce EPM granular resin with titanium catalyst at a reactor temperature of 30° C. The density of the carbon black was 1.8 g/cc. Before the carbon black was introduced into the reactor through the bottom mixing chamber below the distributor plate, it was heated and purged simultaneously to remove absorbed water and oxygen which are poison for the reaction. Purging was done with nitrogen. TIBA was used as the cocatalyst. The partial pressure of ethylene was about 20 psi. The $H_2/C_2$ ratio was in the range of 0.03 to 0.04. The $C_3/C_2$ ratio was maintained in the range of 2.30 to 2.50 to produce amorphous EPM. The concentration of the carbon black in the reactor was kept at about 0.5 to 1.2% by weight throughout the run. An EPM polymer was produced close to or above the softening point of the polymer. An analysis of the EPM samples showed that the polymers were essentially amorphous. The density of the product was in the range of 0.859 to 0.865 g/cc, and the propylene content was from 47% to 53% by weight. The calculated true density of the EPM was in the range of 0.854 to 0.863 g/cc.

EXAMPLE 8

Using a hydrophobic fumed silica (Cab-O-Sil TS-720 available from Cabot Corporation) having a primary particle size of 14 nanometers a specific surface area of 100 $m^2/gm$ and a density of 2.2 g/cc as the inert particulate material, the same reactor, described in Example 1, was utilized at a reaction temperature of 30° C. to produce amorphous EPM. The catalyst employed was a titanium based catalyst as in Example 7. To remove poison from the silica, it was treated exactly the same way as the carbon black was treated. The partial pressure of ethylene was about 30 psi and the $H_2/C_2$ ratio was about 0.02. The $C_3/C_2$ ratio was kept in the range of 2.30 to 3.30 to produce amorphous EPM. The concentration of the silica in the reactor was maintained high (0.6 to 1.3% by weight) to ensure the production of large quantity of sample. The critical concentration of the silica below which fluidization ceases was not determined. An analysis of the samples produced showed that the polymers were amorphous with mixture density of 0.862 to 0.867 g/cc and propylene content of 47% to 52% by weight. Ash analysis of the samples indicated that the amount of the silica in the samples varied from 0.3 to 1.0% by weight. The calculated true density of the EPM is in the range of 0.857 to 0.865 g/cc.

EXAMPLE 9

Production of EPM with a carbon black as the inert particulate material at a reactor temperature of 50° C. which is above the softening point.

The same reactor as in Example 1 was utilized and was operated at 50° C. The vanadium catalyst of Example 1 was also utilized. The carbon black was Raven T-230 carbon black. TIBA and chloroform were used as the cocatalyst and promoter. The partial pressure of ethylene was 85 psi. The $C_3/C_2$ and $H_2/C_2$ ratios were 0.46 and 0.0045, respectively. When the concentration of the carbon black in the reactor was maintained at around 1.5% to 1.8% by weight, the reactor produced carbon black incorporated EPM granular resin without any problems. The density of the carbon black incorporated EPM was 0.870 g/cc. The true density of the EPM, calculated with Equation 1, is about 0.863 g/cc. From FIG. 2, it is seen that the softening point of the EPM is 34° C. and therefore, the reactor temperature was about 16° C. higher than the softening point of the polymer. At the end of the run, however, the carbon black feed did not function properly resulting in gradual decrease of the carbon concentration in the reactor. Consequently, the reactor was shut-down due to defluidization and the chunks were removed from the reactor. The amount of the carbon black in the chunks was determined to be about 0.6% by weight. The density of and propylene content in the chunks were about 0.870 g/cc and 36% by weight, respectively. The true density of the polymer, calculated with Equation 1, is about 0.867 g/cc.

EXAMPLE 10

Production of EPM with a carbon black at a reactor temperature of 66° C.

The same reactor as in Example 9 was initially started up at a reactor temperature of 60° C. with the same vanadium catalyst, TIBA, chloroform and Raven T-230 carbon black as in Example 9. Later the reactor temperature was raised to 66° C. The partial pressure of ethylene was about 89 psi. The $C_3/C_2$ ratio was typically from 0.45 to 0.50. The $H_2/C_2$ ratio was 0.005. By maintaining the concentration of the Raven T-230 carbon black in the reactor at about 5.0% by weight, granular EPM resin was produced without having any reactor operational difficulties. The average particle size of the resin was about 0.081 inches. An analysis of the samples showed that the propylene content was in the range of 30 to 34% by weight; the melt index from 0.50 to 0.63 dg/10 min; and the density from 0.893 to 0.895 g/cc. A thermogravimetric analysis of the samples showed that the concentration of the carbon black in the polymer was about 4.5% by weight. The true density of the samples, calculated with Equation 1, is about 0.873 g/cc. From FIG. 2, it is seen that the softening point of the EPM is 38° C. and therefore, the reactor temperature was about 28° C. higher than the softening point of the EPM.

For Examples 11-13 the same vanadium catalyst and reactor was employed as in Example 1. TIBA and chloroform were used as the cocatalyst and promoter. For both TIBA and chloroform, 10% solution (by weight) in isopentane was made and fed into the reactor at a typical rate of 100 to 150 cc/hr. The total pressure of the reactor was 300 psi. The partial pressure of ethylene was about 60 psi. The molar ratio of hydrogen to ethylene was in the range of 0.002 to 0.004. The partial pressure of propylene in the reactor and the ENB feed rate into the reactor were the two major variables controlled. Raven T-230 carbon black was the particulate material employed to facilitate the reactor operation. The concentration of the carbon black in the reactor and EPDM granular resin was controlled by either controlling the production rate of polymer or the feed rate of the carbon black, or both. To enhance the fluidization and mixing of EPDM granular resin, the reactor was operated at a higher superficial gas velocity; typically, about 2.2 to 2.7 ft/s. Most of the time, the feed rate of the carbon black was maintained high to ensure proper fluidization and to reduce the average particle size of the resin by eliminating the formation of small agglomerates. Typically, the weight fraction of the carbon black in the product was higher than 5%, more specifically, higher than 10%. Due to the large amount of the carbon black in the EPDM, measurement of product density became less meaningful. The true density of each sample was determined by using the measured propylene content and FIG. 3, instead of measuring the mixture density and using Equation 1. Nevertheless, the carbon black in each sample was measured. Crystallinity of each sample was also measured.

EXAMPLE 11

The reactor was operated to produce EPDM granular resin at the following conditions:
Reactor temperature = 60° C.
Superficial gas velocity = 2.5 to 2.77 ft/s
$C_3/C_2$ molar ratio = 1.1 to 1.3
$H_2/C_2$ molar ratio = 0.001 to 0.0025
ENB feed rate = 210 cc/hr
Carbon black feed rate = 700 to 850 g/hr.

Carbon black incorporated EPDM granular resin was produced at the rate of 5 to 8 lb/hr without encountering any serious reactor operational problems. Typical samples have the following properties:
Propylene content = 41.2% by weight
ENB incorporation = 5.1% by weight
Carbon black content = 22.3% by weight
Flow index = 11.5
Average particle size of resin = 0.053 inches The true density of the EPDM, from FIG. 3 with a propylene content of 41.2%, is about 0.86 g/cc. From FIG. 2, it is seen that the softening point of the polymer is 40° C. and therefore the reactor was operated at about 30° C. above the softening point of the polymer without having defluidization when such amount of the carbon black was used.

When the feed rate of the carbon black was reduced to about 300 to 400 g/hr at the same production rate of EPDM, small agglomerates started to form in the reactor and came out with granular resin through the product discharge valve and product discharge tank. A typical sample was analyzed and revealed the following properties:
Propylene content = 49.1% by weight
ENB incorporation = 6.1% by weight
Carbon black content = 12.6% by weight
Flow index = 5.2

Immediately after the small agglomerates were observed, the production rate was reduced to increase the carbon black concentration in the reactor. Granular EPDM resin was produced again. The carbon black content in the resin was higher than 20% by weight, and the average particle size of the resin was typically in the range of 0.061 to 0.084 inches. Other properties of the EPDM were:
Propylene content = 45.8% to 52.3% by weight
ENB incorporation = 3.6% to 7.5% by weight
Flow index = 0.6 to 1.0

When the concentration of the carbon black in the reactor became low again, fluidization ceased due to the formation of channeling flow and the reactor was shutdown. Agglomerates were removed from the reactor and analyzed to reveal the following properties:

Propylene content=40.8% by weight
ENB incorporation=4.3% by weight
Carbon black content=12.5% by weight

EXAMPLE 12

Production of EPDM at 70° C. The reactor was operated to produce EPDM granular resin at the following conditions:
Reactor temperature=70° C.
Superficial gas velocity=2.5 ft/s
$C_3/C_2$ molar ratio=1.3
$H_2/C_2$ molar ratio=0.003
ENB feed rate=210 cc/hr When the concentration of the carbon black in the reactor was maintained high enough, granular EPDM resin was produced. The properties of a typical sample are:
Propylene content=38.1% by weight
ENB incorporation=3.1% by weight
Carbon black content=22.5% by weight
Average particle size of resin=0.076 inches From FIG. 3, the true density of this EPDM sample is about 0.86 g/cc. It is seen from FIG. 2 that the softening of the polymer is 30° C. and therefore the reactor was operated at about 40° C. above the softening point of the material without having defluidization when such amount of the carbon black was used.

To determine the critical carbon black content in the product, the carbon black concentration in the reactor was gradually lowered until the fluidization ceased calling for a reactor shut-down. The chunks were removed from the reactor and analyzed to reveal the following properties:
Propylene content=47.4% by weight
ENB incorporation=4.6% by weight
Carbon black content=10.9% by weight

EXAMPLE 13

Production of EPDM at 80° C. The reactor was operated to produce EPDM granular resin at the following conditions:
Reactor temperature=80° C.
Superficial gas velocity=2.2 ft/s
$C_3/C_2$ molar ratio=1.8
$H_2/C_2$ molar ratio=0.003
ENB feed rate=150 to 210 cc/hr but typically 210 cc/hr.

Carbon black incorporated EPDM resin was produced at a rate of 4 to 6 lb/hr without having any reactor operational problems. Typical samples, which were produced at a $C_3/C_2$ ratio of 1.8, had the following properties:
Propylene content=46.3% by weight
ENB incorporation=2.2% by weight
Carbon black content=25.1% by weight
Flow index=5.9
Average particle size of resin=0.069 inches Small amount of resin agglomerates were observed in the product. This run was prematurely terminated due to some mechanical problems associated with the reactor system. From FIG. 3, the true density of this EPDM sample is below 0.86 g/cc, when the curve is extrapolated. From FIG. 2, the softening point of this polymer is 30° C. This means that the reactor was operated at about 50° C. above the softening point of the material with the amount of the carbon black indicated.

The following Example 14 illustrates the properties of EPDM particles coated with carbon black and which was produced according to the present invention.

EXAMPLE 14

The flow properties of a granular EPDM sample produced with a rubber grade N-650 carbon black powder were measured using the Jenike shear test apparatus. A summary of the results is given in Table I. A Thermogravimetric Analysis (TGA) of this sample shows that this product contains 29% carbon black and 71% polymer by weight. A NMR analysis of this polymer indicates that it is composed of 37% propylene, 8% ENB, and 55% ethylene, all by weight.

The flow properties of the granular EPDM sample were measured at 30° C. and 70° C. The storage temperature of the granular EPDM may be as high as 70° C. during in-plant handling, however, the 30° C. storage temperature is more representative of the conditions existing during bulk shipping. The flow properties were evaluated for instantaneous (zero storage time) and after different storage periods. During storage, the samples were kept in an oven at the specified temperature under load in order to simulate conditions in a storage vessel.

The flow function shown in Table I is a measure of bulk flow properties of solid particles, which is well known and widely accepted in powder mechanics community. On the flow function scale, which ranges from zero to infinity, a higher number represents better flow properties. Typical values of the flow function for free-flowing granular resin range from 4 to 10, while the flow function values for non-flowing resin range from 1 to 3. The conical discharge hopper angle is the angle measured from the bin center line, which is required to maintain mass flow. The minimum bin opening, which is determined from the shear strength of the bulk solid, is the size of the opening over which an arch may form.

TABLE I

| | Storage Time (Hour) at 30° C. and TYL+ Load 10 lbs | |
|---|---|---|
| | 0.0 | 24 |
| Aerated bulk density (lb/ft³) | 32.0 | |
| Packed bulk density (lb/ft³) | 35.7 | |
| Kinematic angle of friction ++ (deg) | 16.7 | |
| Conical discharge hopper angle +++ (deg) | 29 | |
| Flow Function (—) | >20 | 6.0 |
| Minimum conical bin opening (ft) | <0.2 | 1.8 |

| | Storage Time (Hour) at 70° C. and TYL+ Load 10 lbs | | |
|---|---|---|---|
| | 0.0 | 0.5 | 2.0 |
| Kiematic angle of friction ++ (deg) | 19 | | |
| Conical discharge hopper angle +++ (deg) | 26 | | |
| Flow Function (—) | >20 | 14.0 | 8.5 |
| Minimum conical bin opening (ft) | <0.2 | 0.8 | 1.1 |

+ Time yield locus
++ Between the resin and the internal surface of aluminum wall
+++ Relative to the centerline of aluminum bin.

Although the value of the flow function decreases for increased storage time, the value after one day storage at 30° C. is 6.0, which is considered to be easy flowing. At instantaneous flow conditions, the granular EPDM is free flowing, characterized by the high value of flow function and the small value of minimum bin opening. After one day storage at 30° C., the material may arch over a 1.8 feet opening, however, once flow is initiated, the material is again free flowing.

What is claimed is:

1. A resin particle comprising an outer shell having a mixture of an inert particulate material and a sticky polymer said inert particulate material being present in said outer shell in an amount higher than 75% by weight based on the weight of said outer shell, and an inner core having a mixture of said sticky polymer and said inert particulate material said sticky polymer being present in said inner core in an amount higher than 90% by weight based on the weight of said inner core, said resin particle being produced by a fluidized bed polymerization process at temperatures at or above the softening point of said sticky polymers.

2. A resin particle according to claim 1 wherein said inert particulate material is selected from the group consisting of carbon black, silica and clay.

3. A resin particle according to claim 1 wherein said inert particulate material is carbon black having a primary particle size of about 10 to about 100 nanometers, an average size of aggregate of about 0.1 to about 10 microns, a specific surface area of about 30 to about 1,500 $m^2$/gm and a dibutylphthalate absorption of about 80 to about 350 cc/100 grams.

4. A resin particle according to claim 1 wherein said sticky polymer is:
   a. ethylene propylene rubbers; or
   b. ethylene propylene diene termonomer rubbers; or
   c. polybutadiene rubbers; or
   d. high ethylene content propylene ethylene block copolymers.

5. A resin particle according to claim 4 wherein said ethylene propylene diene termonomers are ethylene/propylene/ethylidenenorbornene termonomers.

6. A resin particle having an inner core comprising an inert particulate material and higher than about 90% by weight based on the weight of said inner core of
   a. ethylene propylene rubbers; or
   b. ethylene propylene diene termonomer rubbers; or
   c. polybutadiene rubbers; or
   d. high ethylene content propylene ethylene block copolymers and an outer shell surrounding said inner core comprising a mixture of a. or b. or c. or d. and an inert particulate material selected from the group consisting of carbon black, silica and clay said inert particulate material being present in said outer shell in an amount higher than 75% based on the weight of said outer shell.

7. A resin particle according to claim 6 wherein said inert particulate material is carbon black.

* * * * *